3,150,308
POWER SUPPLY HAVING SIMULATED FIELD CONDITIONS

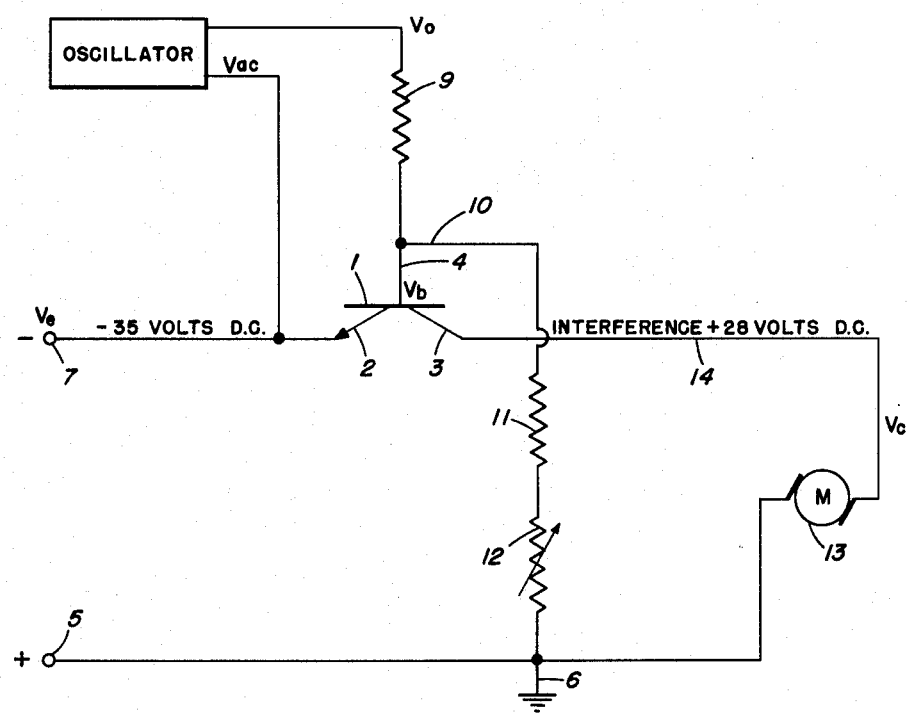

Robert F. Kantner, Glen Burnie, Md., and Myron L. Feistman, Haddonfield, N.J., assignors, by mesne assignments, to the United States of America as represented by the Secretary of the Navy
Filed July 12, 1961, Ser. No. 123,600
3 Claims. (Cl. 318—441)

This invention relates generally to an apparatus for supplying an electrical power signal to electrical motors and other equipment.

More particularly it relates to a power supply which has an imperfect signal, such as that found under prevalent field or actual working conditions. These imperfect signals can be in the form of a D.C. signal which is subject to interference from atmospheric conditions, nearby equipment or loading of the power line. The imperfect signal can have a power drop for extended periods or over short intervals such as found when equipment is switched in and out of the power line, or where the main generator is overloaded.

Current surges also prevail under these conditions and tend to have an adverse effect on any equipment on the power line. These two effects alone can cause burned out fuses and damaged equipment through the setting up of damaging currents and signals within the equipment itself. Furthermore, they tend to cause unreliable operation when dependability may be a necessity.

Additionally there is the effect of alternating signals which are set up by nearby equipment and are impressed on the power line. These signals may have a sinusoidal square, or sawtooth waveform or any combination of them. These conditions are also present on loaded power lines and are especially prevalent where there is a poor loading or power match of the equipment. These conditions can be almost undetectable "ghost" signals which would be extremely difficult to detect with the average field equipment. When they are present, a malfunctioning piece of electrical equipment may be returned to a repair station only to find that it works perfectly under the ideal laboratory or test station conditions.

Under all the above conditions the motor or equipment may have erratic operation and the condition may disappear before the power line is checked. If these conditions appear with any degree of regularity it is natural to replace the equipment; this is especially true where the power line condition is not detected in time or where it is undetectable with field equipment.

With the present invention the possibility of these conditions leading to the above circumstances is reduced to a great extent, if not completely eliminated. The nearly perfect power supplies of the laboratories, test stations or repair stations can be replaced with the portable inexpensive power supply invented herewith. With such a power supply the equipment could be tested against the most adverse conditions that could possibly be expected under actual operating conditions. In this manner, the equipment could be designed or adjusted to be insensitive to these conditions and therefore operate satisfactorily under most conditions. If the equipment is found to be unreliable under the conditions encountered, additionally available equipment may be tested for reliability under these simulated conditions.

Furthermore this power supply is easily transported and can be moved to small test stations in the area where the adverse conditions are normally encountered. In this respect the power supply can be set to the conditions actually encountered, these conditions possibly being different than those expected by the distant design facility which originally developed the equipment.

The present invention reduces the possibility of such happenings when equipment is transferred from station to field use.

Prior art devices generally utilize a transformer for coupling the interference signal from a suitable signal source onto the power signal. However, this type of circuitry has been observed to present certain shortcomings due to a critical lower frequency limit for operation and poor voltage regulation over the frequency range. These shortcomings or disadvantages of the prior art are overcome by the improvements of the instant invention in the utilization of a novel transistor circuit for materially improved overall performance. The circuit of the invention permits satisfactory operation over an extended frequency range from D.C. to a substantially increased upper limit which is dependent primarily only upon the characteristics of the particular transistor used. Furthermore, the amplitude or magnitude of the interference signal can be selectively varied, or maintained linear, if desired, over a wide range.

One object of this invention is to provide a power supply displaying characteristics of greater versatility than conventional power supply systems heretofore or now in general uses.

Another object of the invention is to provide a power supply for laboratory or other ideal condition uses having a predetermined desired imperfect signal output, and which output simulates commonly encountered conditions of power supplies when operated under adverse or field conditions.

Another object is to provide a power supply which simulates ambient or predetermined injected interference signals.

Another object is to provide a power supply which simulates conditions found in different environments.

Another object is to provide a D.C. power supply circuit which simulates a wide range of interference conditions found under field conditions.

Various other objects and advantages will appear from the following description of one embodiment of the invention and the novel features will be particularly pointed out hereinafter in connection with the appended claims.

The figure is a schematic diagram of the circuit of the instant invention.

In the illustrated embodiment of the invention, use is made of any transistor which is available in the open market. One such type of transistor, for example, is a Delco ZN173. The transistor illustrated is an NPN transistor which has an emitter 2, a collector 3 and a base electrode 4. The emitter electrode 2 acts as the input terminal and is connected to a source of electrical power $V_e$. This source may consist of any source of D.C. voltage. The positive terminal 5 of the voltage source $V_e$ is connected to a ground 6 and the negative terminal 7 is connected with the emitter lead 2.

A source of control signals 8 is connected between the emitter lead 2 and the base lead 4 or control electrode. The base lead 4 also has a 1.5K ohms resistor 9 disposed between the base terminal 4 and the source of control signal 8. The source of control signals 8 may be any type in which the frequency and amplitude of the signal may be varied. One such commercially available type is the Hewlett-Packard 202C oscillator.

The base terminal also has one terminal 10 of a resistive bias connected to it. The other terminal is connected to the ground 6. The resistors 11 and 12 of the bias circuit are adjustable between the limits of 1.5K ohms and 2.5K ohms.

The collector terminal 14 acts as the output terminal and is connected to the electrical load such as the motor 13.

The D.C. potential at the base terminal 4 is controlled by the ratio of the adjustable resistors 11 and 12 and the base resistor 9.

Assuming that the variable oscillator 8 has no signal on it, that is a signal of zero volts to be more descriptive, the oscillator 8 then offers no potential change between the emitter lead 2 and the base resistor 9 and can effectively be considered as a short circuit for purposes of circuit analysis. Under the condition of no A.C. signal, one end of the base resistor 9 is at the same potential as the emitter lead 2, that is, 35 v. D.C. The voltage at the other end of the base resistor 9 is controlled by the ratio of the magnitudes of the base resistor 9 to the sum of the magnitudes of the base and bias resistors.

$$\frac{V_e + R_9}{R_9 + R_{11} + R_{12}}$$

From this formula it can be seen that the D.C. base voltage is variable between the limits of $-17.5$ v. D.C. to $-13.125$ v. D.C.

In an NPN transistor the direction of electron current flow is into the emitter or opposite the direction of the arrow. Most of the emitter current flows toward the collector 3; in practical application from 92 to 98% of the emitter current flows through the collector 3, the remainder flows through the base 4. To facilitate the circuit explanation, the flow of the minority carriers across the reverse biased base collector junction and the effects of the collector-base currents will be ignored.

As the potential of the base 4 becomes more positive with respect to the emitter 2 the flow of electrons increase. This corresponding increase in the flow of electrons causes a drop in potential $V_c$ across the load terminal 14 and a corresponding change in the operation of the load device 13.

From the discussion of the biasing circuit it can be seen that a lowering or raising of the impedance in the adjustable bias resistor 12 will cause a corresponding raising or lowering of the emitter to base voltage $V_{eb}$. This raising or lowering of the base potential $V_b$ will in turn cause an increase or decrease in the electron flow and a corresponding drop or rise in the load voltage. From this it can be seen that an increase in the bias resistance $R_{11}$ and $R_{12}$ causes a corresponding increase in the D.C. output voltage $V_c$ and that a decrease in the bias resistance $R_{11}$ and $R_{12}$ will cause a corresponding D.C. voltage drop.

The same analysis applies to the circuit when a simulated interference condition is generated. In this situation, an A.C. signal $V_{ac}$ is formed by the oscillator 8. This A.C. signal is adjusted to any desired frequency or magnitude within reasonable limits.

With the application of the interference condition $V_{ac}$ the output of the oscillator: $V_o = V_e + V_{ac} f(t)$. This in turn causes the oscillator output signal to vary from the negative D.C. input signal with a function of time.

A rise in the oscillator signal $V_{ac}$ will cause a voltage rise at the base 4 of the transistor 1 and a decrease in the oscillator signal will cause a corresponding voltage decrease at the base 4. This continuous rise and decrease in base voltage will cause a corresponding rise and decrease in the electron current flow and in turn cause a falling and rising output voltage $V_e$ to be applied to the load 13.

The type oscillator used has been only for purposes of example and could be any signal source such as ones that would provide simulated surge currents and potential drops or any other conditions found in the field. It will be understood that various changes in the details, materials and arrangement of parts, which have been herein described and illustrated in order to explain the nature of the invention, may be made by those skilled in the art within the principle and scope of the invention as expressed in the appended claims.

What is claimed is:

1. A power supply having recurring interference signals imposed on the output line comprising an electronic valve including input, output and control electrodes, a potential source to be modified, one terminal of said potential source being connected to the input electrode, a source of control signals for simulating recurring interference conditions, said control signal source being connected between the input and control electrodes, a motor to be operated, said motor being connected between the output electrode and a second side of said input source whereby the motor is operated under recurring interference conditions.

2. The power supply as set forth in claim 1 and an adjustable impedance means connected between said second side of said potential source and said control electrode, a second impedance means connected in series circuit relationship between said control electrode and said source of control signals, whereby said adjustable impedance means will control the D.C. signal on the output electrode.

3. A power supply having recurring interference signals imposed on the output line comprising a transistor having emitter, collector and base electrodes, a D.C. potential source to be modified, one terminal of said potential source being connected to the emitter electrode, a source of control signals for simulating recurring interference conditions, said control signal source being connected between the emitter electrode and the base electrode, a resistor in series between said base electrode and said control signal source, a motor to be operated, said motor being connected between the collector electrode and a second side of said D.C. source, an adjustable resistor connected between said second side of said D.C. source and said base electrode, said adjustable resistor being adapted to control the D.C. signal level on said collector terminal, said control signal source being adapted to modify the signal on the collector electrode and thereby operate the motor under simulated recurring interference conditions.

References Cited in the file of this patent

UNITED STATES PATENTS 3,038,110    Paist _____ June 5, 1962